United States Patent

[11] 3,583,510

[72] Inventor Paul F. Hastings
1206 East Gordon Ave., Spokane, Wash. 99207
[21] Appl. No. 788,674
[22] Filed Dec. 5, 1968
[45] Patented June 8, 1971

[54] ARTICULATE POWER DRIVEN LAND VEHICLE WITH A DEMOUNTABLE GOLF BAG CART AS A FRONT SECTION
5 Claims, 8 Drawing Figs.

[52] U.S. Cl. .................................................. 180/11, 280/515, 280/111
[51] Int. Cl. ...................................................... B62d 13/02
[50] Field of Search .......................................... 180/11, 12, 13, 27, 25; 280/492, 494, 515, 111

[56] References Cited
UNITED STATES PATENTS

| | | | |
|---|---|---|---|
| 2,828,827 | 4/1958 | Chouinard.................... | 180/12 |
| 2,867,449 | 1/1959 | Shawver...................... | 180/11X |
| 2,890,065 | 6/1959 | Shaffer....................... | 280/492 |
| 2,895,279 | 7/1959 | Schrage...................... | 180/11X |
| 2,919,758 | 1/1960 | Newton et al................ | 180/25 |
| 3,059,713 | 10/1962 | Beggs........................ | 180/13 |
| 3,087,562 | 4/1963 | Harks........................ | 180/11 |
| 3,134,607 | 5/1964 | Doll.......................... | 280/111X |
| 3,199,621 | 8/1965 | Seaman...................... | 180/11 |

*Primary Examiner*—Kenneth H. Betts
*Attorney*—Alex Lagaard

ABSTRACT: An articulate power driven pusher-type land vehicle with a rear section having a wheel supported frame carrying an engine for driving the wheels, a tongue projecting forwardly therefrom and a seat supported golf bag supporting means with a handle projection therefrom, said front section being pivotally connected to said rear section for steering purposes and being detachable therefrom to permit of using the front section as a manually propelled golf bag cart.

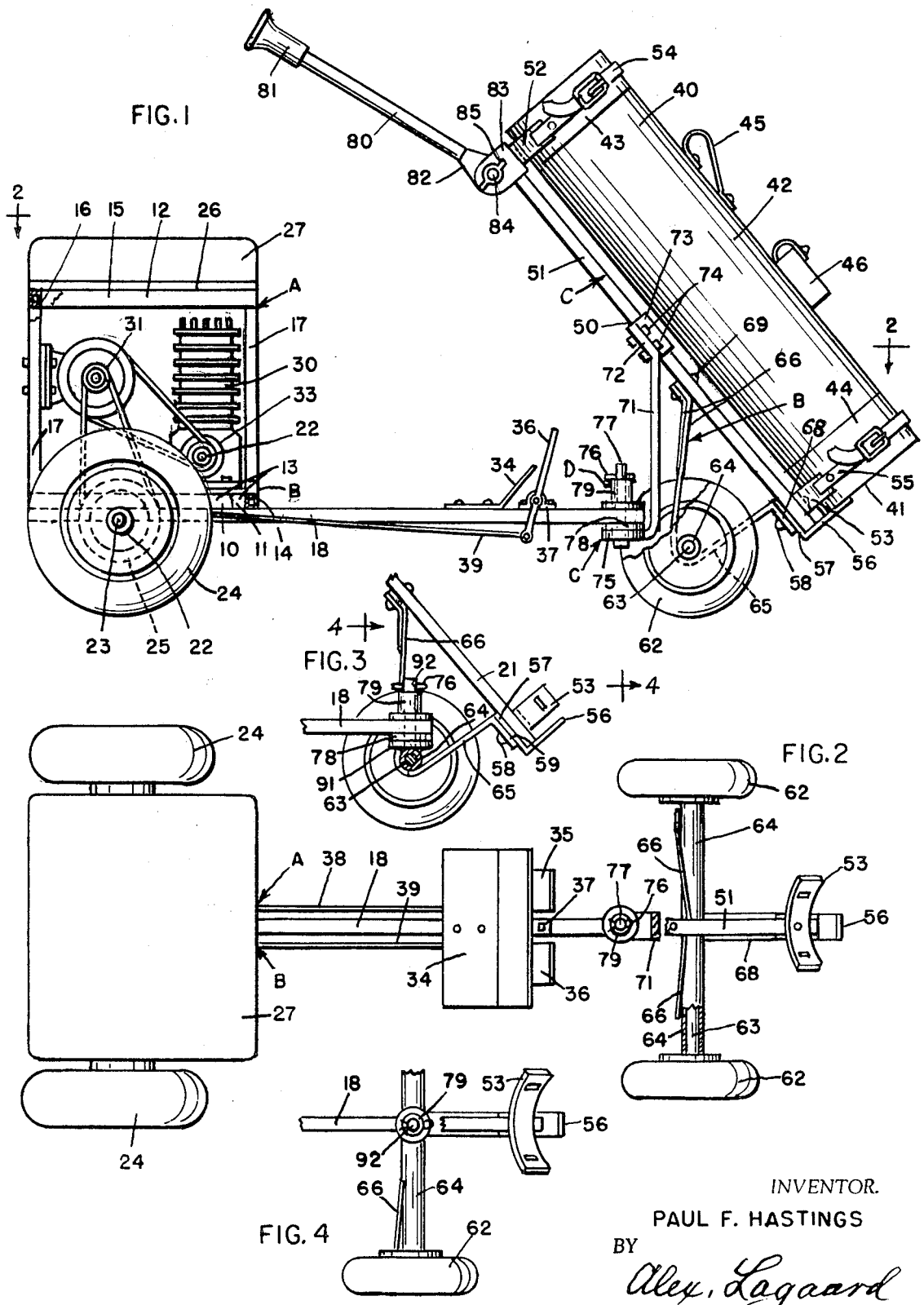

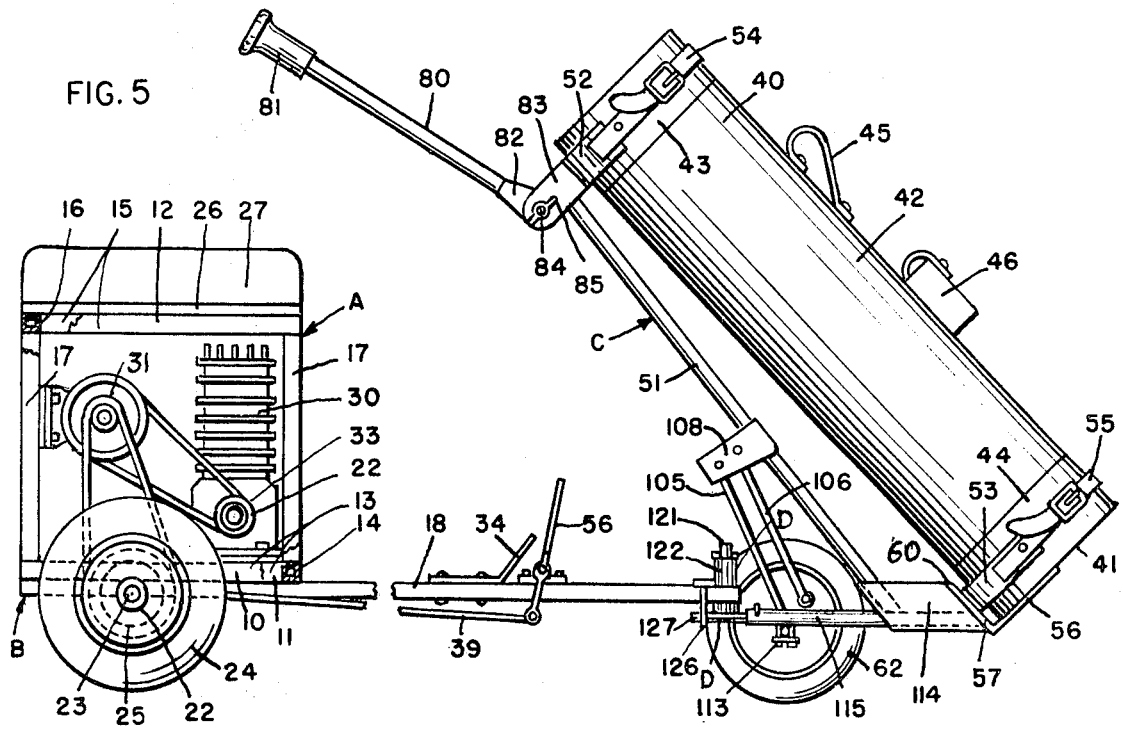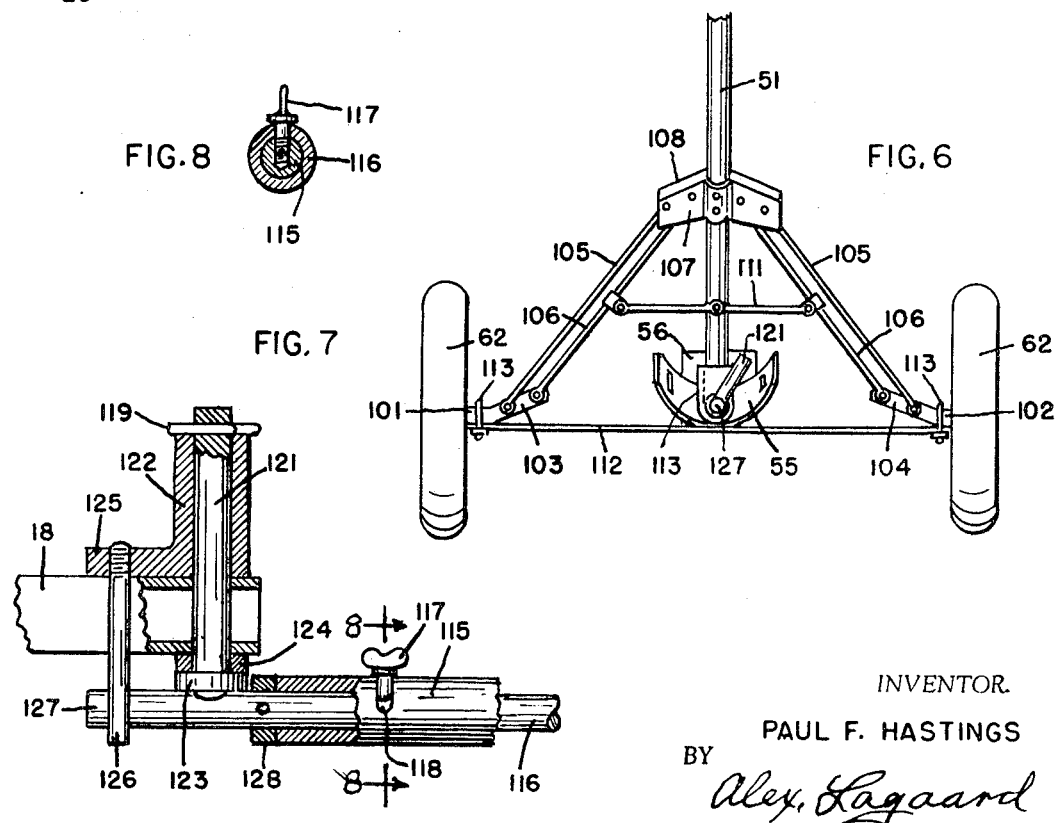

ARTICULATE POWER DRIVEN LAND VEHICLE WITH A DEMOUNTABLE GOLF BAG CART AS A FRONT SECTION

CROSS-REFERENCES

None.

FIELD OF THE INVENTION

The invention relates to articulate power driven land vehicles with a removable front section supporting a golf bag and adapted to be used as a manually propelled golf bag cart.

PRIOR ART

To applicants's knowledge no prior art vehicle has employed a golf cart as the steering section of an articulate power driven land vehicle nor has such section been made removable to permit of manually propelling the cart.

SUMMARY OF THE INVENTION

Applicant has produced an articulate power driven land vehicle having a seat for the operator and a detachable golf cart used for steering the vehicle and adapted to be detached and used as a manually operated golf cart.

In the drawings:

FIG. 1 is an elevational view of a land vehicle illustrating an embodiment of the invention and with a golf bag mounted thereon.

FIG. 2 is a plan sectional view of the vehicle shown in FIG. 1 and taken on line 2–2 of FIG. 1 and with the golf bag removed.

FIG. 3 is a fragmentary elevational sectional view of a modification of the invention.

FIG. 4 is a fragmentary plan sectional view of the structure shown in FIG. 3 and taken on line 4–4 of FIG. 3.

FIG. 5 is a view similar to FIG. 1 showing the invention applied to a foldable type of golf cart.

FIG. 6 is an end view of the golf cart with the tractor removed.

FIG. 7 is a vertical sectional view of the pivoted steering means of the invention used with the form of the invention shown in FIG. 5.

FIG. 8 is a detail sectional view taken on line 8–8 of FIG. 7.

The instant invention comprises an articulate power driven land vehicle indicated in its entirety by the reference character A. This vehicle includes a rear section B serving as a power truck and a front section C in the form of a golf bag cart. These sections are pivotally connected together by means of steering means D and by means of which the two sections may be disconnected and the front section used as a manually driven golf cart.

POWER TRUCK

The rear section A serves as a power truck which comprises a frame structure 10 having a lower frame 11 and an upper frame 12. The lower frame is constructed with longitudinal frame members 13 and with transverse frame members 14. The frame 12 is constructed with longitudinal frame members 15 and transverse frame members 16. Between the two frames 11 and 12 are posts 17. The frame members and posts are all welded together to form a unitary frame structure. Extending beneath the frame 11 is a tongue 18 which is secured to the frame members 14 and which extends forwardly of said frame.

Attached to the under side of the frame members 13 of frame 11 are bearings 22 which rotatably support the two parts of a divided live axle 23. The parts of this axle have mounted on them ground engaging driving wheels 24 which, when the shaft 23 is rotated, serve to propel the vehicle A forwardly. Mounted on the parts of axle 23 is a differential 25 for preventing slippage between the wheels when making a turn and whose rotary member is driven by a transmission 31. This, however, forming no particular feature of the invention and being well known in the art has not been shown in detail in the drawings.

For driving the wheels a gasoline engine 30 has been sketchily shown in FIG. 1 and similarly the reduction transmission 31. This transmission includes a clutch 33 by means of which the vehicle may be driven or not, without stopping the engine. Such construction being well known in the art has not been shown in detail and any suitable driving and control means may be used.

On the tongue 18 is mounted a foot rest 34 and adjacent the same are two pedals, 35 and 36, which are pivoted to bearing means 37 fast on the tongue 18. These pedals have links 38 and 39 connected to them which extend rearwardly thereof. The pedal 35 is connected to the carburetor valve of the engine and the link 39 is connected to the clutch and brake and operates in its rearward position to let the clutch in and in its forward position to let the clutch out and apply the brakes.

A board 26 overlies the frame 12 and is secured thereto. A cushion 27 rests upon the board 26 and serves as a seat for the operator of the vehicle.

FRONT SECTION

For the purpose of explaining the invention, a golf bag 40 has been shown in FIG. 1 which has a bottom 41 a flexible tubular container 42 secured thereto and formed with an open end through which the golf clubs may be inserted into the same. The bag has a collar 43 attached to the upper end of the same which may be constructed of leather or some similar material and which holds the bag open for the reception of the clubs. A similar collar 44 encircles the bag at the lower end of the same. The bag also has a handle 45 by means of which it may be carried and a pocket 46 for golf balls.

The golf bag 40 is mounted on a golf bag supporting means 50 which includes an elongated member 51 in the form of an elongated bar. This bar has secured to its upper and lower ends saddles 52 and 53 which are arcuate in form and fit about portions of the bag at the localities of the collars 43 and 44. Attached to these saddles are straps 54 and 55 which encircle the bag at the collars 43 and 44. The bag 40 rests on a shell 56 extending outwardly from supporting means 60 having a plate 57 overlying the lower end of the elongated member 51. Rivet 58 extends through the plate 57, the elongated member 51 and the saddle 53 and holds the parts assembled.

The golf bag supporting means 50 is carried by two ground engaging free running wheels 62 which are rotatably mounted on an axle 63 disposed in a tubular axle housing 64. Issuing downwardly from the attachment 57 is a bracket 65 which is welded to the axle housing 64. This bracket has a flange 68 overlying the attachment 57 and is held in position by means of the rivet 58. In addition to the bracket 65, two braces 66 are employed which are secured to the elongated member 51 by means of a rivet 69 and which are welded to the ends of the tubular axle housing 64 at the ends of the same. Axle housing 64, bracket 65 and braces 66 form part of the golf bag supporting means 50.

STEERING MEANS

The steering means C utilizes a hanger 71 which has a flange 72 underlying the elongated member 51 of the supporting means 50. Overlying said elongated member is a cap 73 which is bolted to the flange 72 by bolts 74 and thus clamps hanger 71 to said elongated member. With this construction the hanger may be adjustably positioned on the elongated member. At the lower end of the hanger 71 is welded to it a horizontal arm 75 which is in the form of a circular disc serving as the fifth wheel of a vertical axis steering device. Extending through the arm 75 and tongue 18 is a post 77 which is also welded to said arm and extending upwardly above the same. The end of the tongue 18 has welded to it on the under side of the same, a circular plate 78 and to the upper side of the same a flanged bearing 79. This bearing, the tongue 18 and plate 78 is drilled to receive the post 77 with the plate 78 resting upon the arm 75. A cotter key 76 attached to the end of the bolt 77 serves to hold the parts assembled.

For steering the vehicle, a handle 80 is employed which has a hand grip 81 at one end and a drilled fitting 82 at its other end. This fitting fits between the sides of a U-shaped clip 83 and a bolt 84 extends through both said fitting and clips and guides the handle 80 for swinging movement about the bolt as an axis. A wing nut 85 on said bolt clamps the handle 80 in position. The clip 83 and the saddle 52 are held attached to the upper end of the elongated member 51 by means of a rivet not shown which passes through the saddle 52 and said elongated member.

In FIGS. 3 and 4 a modification of the invention is shown in which the same reference characters have been used to designate the corresponding parts. In this modification the hanger 71 has been dispensed with and a fifth wheel 91 substituted in place of the arm 75. This wheel is welded to the axle housing 64 and has a stub axle 92 issuing upwardly therefrom and taking the place of the bolt 77. The construction on the tongue 18 remains the same and is applied to the stub axle 92 in the same manner as with the other form of the invention.

While the invention as shown in FIGS. 1 through 4 has been illustrated as applied to a golf cart, the wheels of which are mounted on a single axle, the device can also be applied to a foldable golf cart as shown in FIGS. 5, 6 and 7 and in which the wheels are supported on separate axles and are adapted to be moved toward the elongated member of the golf bag supporting means.

Since the rear section of the invention and the golf bag supporting means of the two disclosures are practically the same, the description of these parts will not be repeated and the same reference numerals used to designate the same parts.

In FIGS. 5, 6 and 7 the wheels 62 are mounted on stub axles 101 and 102. These axles have upwardly inclined short extensions, 103 and 104 and to which are pivoted upwardly inclined pairs of rods 105 and 106. The upper ends of these rods are pivoted between spaced plates 107 and 108 secured to the elongated member 51. To prevent the wheels 62 from spreading when the cart is erected, a folding brace 111 is employed which is pivoted to the rods 106. In addition, a tie rod 112 is employed which is secured to the stub axles 101 and 102 by means of U-bolts 113.

At the lower end of the elongated member 51 are provided two spaced plates 113 and 114 which are welded to said member and which extend forwardly of the same. The attachment 57 carrying the shelf 56 is welded to the forward edges of these plates. In addition, a horizontally extending tube 115 is disposed between the lower portions of the plates 113 and 114 and welded thereto. Rotatably mounted in the tube 115 is a shaft 116 which has a threaded pin 117 movable in an arcuate slot 118 in tube 115 and screwed into said shaft to restrain endwise movement of the shaft while permitting limited rotary movement of the same.

The shaft 116 has extending upwardly from the same a post 121 which is journaled in a bearing 122 welded to the end of the tongue 18 of the tractor section B. The post 121 has a collar 123 fixed to it near the bottom of the same. Welded to the underside of tongue 18 is a collar 124 receiving post 121 and resting on collar 123. A cotter key 119 extending through the upper end of post 121 holds the parts assembled. Issuing from the bearing 122 is a plate 125 which has depending therefrom on each side of the tongue 18 a pin 126 and between which an extension 127 of shaft 116 swings. These pins serve as stops to limit the turning of the golf cart into engagement with the foot rest 34 and pedals 35 and 36.

The advantages of the invention are manifest. The vehicle readily carries both the golfer and his equipment. The golf bag supporting means together with the free running ground engaging wheels and the handle connected thereto forms the front section of the vehicle and gives to the same a double-function forming part of the steering means and supporting the gold bag. The front section is disengageable from the rear section and when disengaged serves as a manually operated golf cart. Removal of the front section is simple and easy and can be accomplished quickly. By the use of the hanger which is left attached to the elongated member, the rear section constituting the power truck may be hitched to existing golf carts. When sold as a complete unit the hitch may be permanently applied to the cart as shown in FIGS. 3 and 4 or to any suitable part of the front section or golf cart. While a gasoline engine has been shown as the motive power, the power truck may be driven by a battery operating on electric motor connected to the driving wheels by a suitable transmission as is now well known in the art.

What I believe to be new and desire to be covered by Letters Patent is set forth in the following claims.

I claim:

1. An articulate power driven pusher-type land vehicle with removable front section comprising:
   a. a frame,
   b. ground engaging driving wheels rotatably mounted on said frame,
   c. power means on said frame and driving said driving wheels,
   d. a tongue attached to said frame and extending forwardly thereof,
   e. a seat carried by said frame and disposed in proximity to said power means,
   f. golf bag supporting means adapted to hold a golf bag,
   g. ground engaging free running wheel means carried by said bag supporting means and including
   h. an elongated member,
   i. a handle attached to said bag supporting means and extending toward said seat,
   j. pivotal steering means acting between said tongue and supporting means and including
   k. pivot means having a substantially horizontal axis, and
   l. pivot means having a substantially vertical axis,
   m. said last-named pivot means including
   n. a substantially vertically disposed stub axle carried by the supporting means and
   o. a bushing mounted on the tongue for the reception of the stub axle and detachable from the stub axle.

2. A vehicle according to claim 1 in which:
   a. the free running wheels are journaled in
   b. spaced bearings connected together by
   c. a transverse member forming part of the supporting means,
   d. and said substantially vertical stub axle extends upwardly from said transverse member.

3. A vehicle according to claim 1 in which:
   a. a circular plate encircles the stub axle and is fixed relative thereto and serves as a fifth wheel, and
   b. a similar plate encircling the stub axle engages the fifth wheel and is fixed relative to the tongue.

4. A vehicle according to claim 1 in which:
   a. the horizontal pivot means includes a bearing secured to the elongated member and extending in a longitudinal direction, and
   b. a shaft is journaled in said bearing.

5. A vehicle according to claim 4 in which:
   a. the bearing has an arcuate slot and
   b. the bearing shaft has a detachable member extending outwardly therefrom and movable in said slot to limit the relative movement between the bearing and shaft.